US012060852B2

(12) United States Patent
Nemanick et al.

(10) Patent No.: US 12,060,852 B2
(45) Date of Patent: Aug. 13, 2024

(54) ELECTROCHEMICAL ROCKET MOTOR

(71) Applicant: The Aerospace Corporation, El Segundo, CA (US)

(72) Inventors: Eric Joseph Nemanick, Santa Monica, CA (US); Andrea Hsu, El Segundo, CA (US); John Schilling, Lancaster, CA (US); John Desain, Redondo Beach, CA (US); Brian Brady, Seal Beach, CA (US); Andrew Cortopassi, Running Springs, CA (US)

(73) Assignee: THE AEROSPACE CORPORATION, El Segundo, CA (US)

( * ) Notice: Subject to any disclaimer, the term of this patent is extended or adjusted under 35 U.S.C. 154(b) by 271 days.

(21) Appl. No.: 17/454,691

(22) Filed: Nov. 12, 2021

(65) Prior Publication Data

US 2023/0151779 A1    May 18, 2023

(51) Int. Cl.
*F02K 9/24* (2006.01)
(52) U.S. Cl.
CPC .................... *F02K 9/24* (2013.01)
(58) Field of Classification Search
CPC ..... F02K 9/14; F02K 9/24; F02K 9/38; F02K 9/68; F02K 9/72
See application file for complete search history.

(56) References Cited

U.S. PATENT DOCUMENTS

| | | | |
|---|---|---|---|
| 11,852,101 B1* | 12/2023 | Hundley | F02K 9/24 |
| 2004/0244890 A1 | 12/2004 | Cesaroni et al. | |
| 2014/0109551 A1 | 4/2014 | Tappan et al. | |
| 2016/0032867 A1 | 2/2016 | Mahaffy et al. | |
| 2017/0096968 A1* | 4/2017 | McBain | F02K 9/14 |
| 2018/0128207 A1* | 5/2018 | Villarreal | F02K 9/26 |

\* cited by examiner

*Primary Examiner* — Gerald L Sung
(74) *Attorney, Agent, or Firm* — Knobbe Martens Olson & Bear

(57) ABSTRACT

Solid rocket motors are provided herein. In certain embodiments, a solid rocket motor includes a housing containing thin layers of fuel and thin layers of an inert oxidizer, separated by a thin nonconductive layer. The housing has a nozzle at the end for gas release and channeling. Prior to use, the inert oxidizer is activated by electrochemical oxidation which can generate an active oxidizer and additional fuel. Ignition of the oxidizer and fuel can be triggered whereby the contents of the housing can ignite, generating hot gasses to be channeled out through the nozzle to generate thrust. Replacing current state solid rocket motors with embodiments described herein can improve cost, safety and increase capability. The disclosed embodiments can be safe to transport, store, and handle. Additionally, there can be no moving parts unlike hybrid or liquid rocket motors.

20 Claims, 6 Drawing Sheets

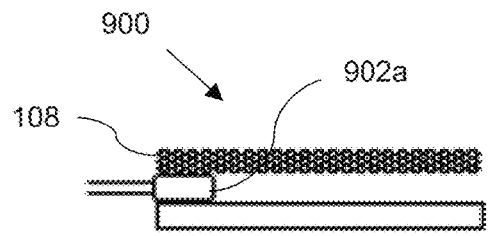
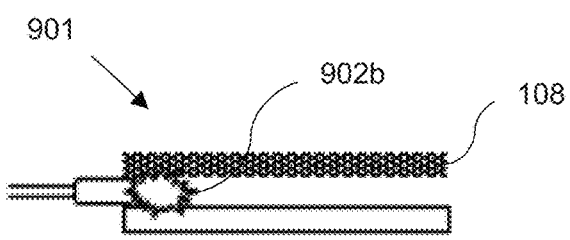
*Figure 7A*      *Figure 7B*
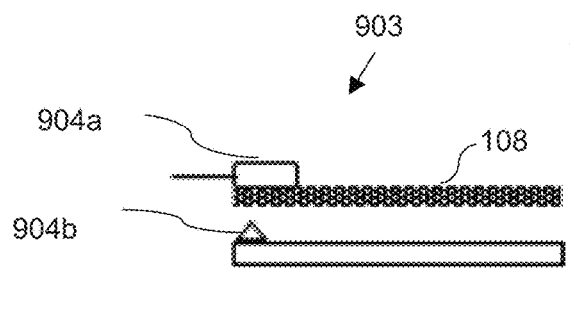
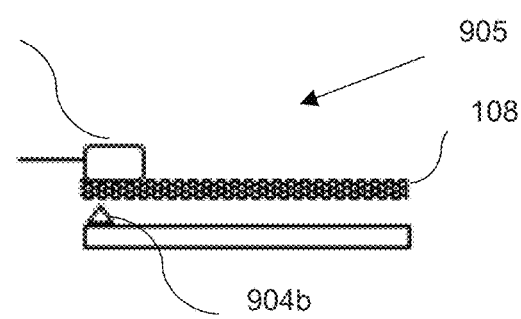
*Figure 8A*      *Figure 8B*
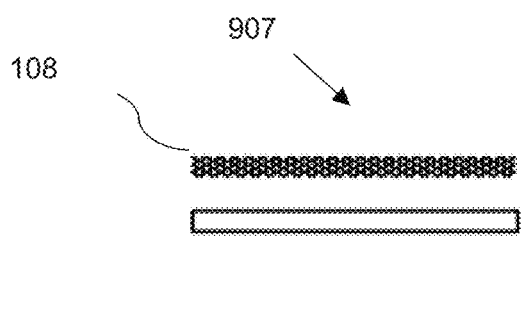
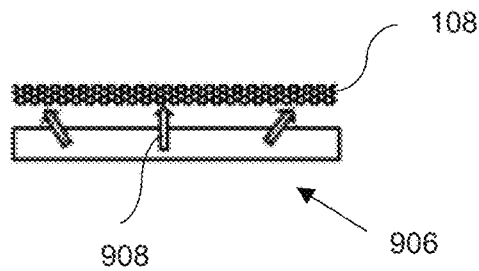
*Figure 9A*      *Figure 9B*

ELECTROCHEMICAL ROCKET MOTOR

BACKGROUND

Field of the Inventions

This disclosure relates to a rocket motor that uses electrochemical activation of the oxidizer and fuel prior to activation. This rocket motor can be shipped and stored with an inert oxidizer and/or fuel that can be activated prior to use. The use of inert oxidizer and fuel allows for safe transport, storage, and handling of the solid rocket motor, as well as a controllable oxidizer to fuel ratio and thrust level.

Description of the Related Art

The current state of the art of rocket motors consists of solid motors, liquid motors, and hybrid motors. Solid motors combine a solid fuel with an active solid oxidizer and are susceptible to premature activation from environmental conditions. It also has a predetermined thrust level based on motor design and manufacture. Liquid rocket motors typically use pressurized oxidizers and complex pumps to move liquids through the motor to the fuel. This allows for selectable thrust levels, but often requires not only moving pumps but also cryogenic liquids. Hybrid motors typically use a solid fuel and a liquid oxidizer. Hybrid motors behave like the fully liquid systems in their complexity and thrust control.

Solid rocket motors require extensive handling and storage requirements to avoid accidental triggering of the motor. Other controllable motors such as liquid or hybrid rocket motors require pumps and moving parts, increasing complexity and failure points. Liquid and hybrid motors may require pressurized oxidizers and/or fuels or cryogenic liquids in addition to complex pumps to move the liquids through the motor.

Typical solid rocket motors are comprised of high energy materials such as oxidizing salts or materials and carbonaceous or other types of fuels. These mixtures of oxidizer and fuel are classed as explosives and the manufacturing, storage, and distribution of them is not without risk. The manufacturing stage is often the most dangerous step and many chemical plants manufacturing these materials have exploded. In addition, many applications for solid rocket motors are in highly unpredictable locations such as war zones.

Current solid state rocket motors have a thrust capability fixed at the point of fabrication, which does not allow for a variable impulse. For conventional rocket motors, the amount of thrust is set from the design and manufacture point and cannot be changed. This is due to several factors, including the defined mixture and mass of the active oxidizer and fuel.

SUMMARY OF THE INVENTIONS

An aspect of at least one of the inventions disclosed herein includes the realization that an electrochemical rocket motor can be manufactured using oxidizer and/or fuel in an inert state and later activated. For example, an electrochemical rocket motor according to some embodiments disclosed herein can be manufactured with materials that can be electrochemically converted to oxidizing or reducing states from an inert state. Prior to activating such a device, there is no substantial amount of oxidizing material available for supporting combustion. Thus, the completed motor, prior to activation, can be incorporated into a space launch vehicle, military vehicle, or ordnance without risk of accidental ignition. The motor can then be activated at a desired time, for example but without limitation, after the space launch vehicle has been set on the launchpad and otherwise, fully prepared and oriented for launch, or in a military rocket launcher prior to engaging an enemy. The motor can be activated by way of an electrochemical process, creating an oxidizing material from the as manufactured solid rocket material(s), for example, by applying an electrical potential to the material. This potential forces an electrochemical change in the oxidizer and fuel precursors converting them into mission ready oxidizer and fuel. The solid rocket motor would then be ready for ignition.

Another aspect of at least one of the inventions disclosed herein includes the realization that using an electrochemically activated material for a solid rocket motor allows for adjustment of the thrust generated by the motor, after final design, assembly, transport, storage, and/or deployment of the motor. For example, adjusting the quantity of electricity applied to the electrochemical material or by adjusting the voltage at which the electricity is applied, the amount of oxidizing material created can be adjusted. Due to the balance of oxidizer and fuel, more oxidizer will produce more thrust and less oxidizer will produce less thrust. Thrust output of conventional solid rocket motors cannot be adjusted after manufacture as the ratio of oxidizer and fuel is preset by the quantities of the actively oxidizing materials. Thus, such embodiments create additional opportunities for accommodating late payload changes, for example, in missions with late-addition rideshare capabilities or other changes to payload, space vehicle, or other launch parameters. It allows control of landing location for terrestrially targeted rockets by increasing or decreasing the amount of thrust.

Another aspect of at least one of the inventions disclosed herein includes the realization that by forming a solid rocket motor with a spiral or planar configuration allows for a simpler manufacturing process. For example, with the spiral configuration, thin layers of oxidizer, fuel, and separator can be alternatingly stacked and then rolled into a spiral. Thus, such embodiments which can provide enhanced manufacturing efficiency. This can also be achieved through the use of interdigitated planes, rods, or other structures that creates a defined mixing of the oxidizer and fuel, a critical and difficult to control feature in solid rocket motor manufacture.

Another aspect of at least one of the inventions disclosed herein includes the realization that creation of oxidizer and/or fuel on demand allows for the use of materials that are typically considered too unstable or reactive for solid rocket motors. These materials may be too unstable to last from manufacture to usage, too shock sensitive for transport, or too high energy to risk in manufacture. Since the electrochemical rocket motor generates the oxidizer and/or fuel within the motor prior to activation potentially at the location of usage, the range of materials that can be used can encompass compounds that would otherwise be too dangerous for conventional solid rocket motor application.

Thus, in some embodiments, an electrochemical rocket includes a rocket body, a motor disposed within the rocket body, and a nozzle. The motor is disposed within the rocket body. The motor includes an oxidizable framework, a reducible framework, and a non-electrically conductive separator. The oxidizable framework comprises an oxidizable material. The oxidizable material being electrochemically convertible such that during electrical charging, at least a portion of the oxidizable material is converted into an active oxidizer. A first conductive framework is in electrical communication with the oxidizable material. The reducible framework comprises a reducible material, which, during charging, is at least partially reducible to a fuel. A second conductive framework is in electrical communication with the reducible material. The non-electrically conductive separator is positioned between and electrically separating the oxidizable material and the reducible material. The nozzle is fluidically connected to an end of the motor, wherein the nozzle is shaped to generate thrust by discharging gases. Prior to charging, the oxidizable material and the reducible material are substantially inert and wherein after charging, in use, the active oxidizer and the fuel can be combined to combust, and thereby create combustion gases discharged through the nozzle and generate thrust.

In some embodiments, the electrochemical rocket includes a mechanism for piercing the non-electrically conductive separator.

In some embodiments, the thrust is controlled by partially charging the oxidizable material and the reducible material.

In some embodiments, the oxidizable material and the reducible material are shaped as thin spiral sleeves separated by thin spiral sleeves of the non-electrically conductive separator.

In some embodiments, the oxidizable material and the reducible material are configured in thin planar layers separated by thin planar layers of the non-electrically conductive separator.

In some embodiments, the oxidizable material and the reducible material are arranged in an interdigitated array.

In some embodiments, the oxidizable material and the reducible material comprise thin flat layers.

In another embodiment, an electrochemical motor comprises a housing enclosing an interior space. The interior space of the housing comprises an oxidizable framework, a reducible framework, and a non-conductive framework. The oxidizable framework comprises an oxidizable material. The oxidizable material is electrochemically convertible such that during electrical charging at least a portion of the oxidizable material is converted into an active oxidizer. The reducible framework comprises a reducible material, which, during charging, is at least partially reducible to a fuel. The non-electrically conductive separator is positioned between the oxidizable material and the reducible material. Prior to charging, the oxidizable material and the reducible material are substantially inert and wherein after charging, in use, the active oxidizer and the fuel can be combined to combust, and thereby create combustion gases discharged through a nozzle and generate a thrust.

In some embodiments, the reducing framework is converted into the fuel.

In some embodiments, the thrust is controlled by partially charging the oxidizable material and partially charging the reducible material.

In some embodiments, the oxidizable material and the reducible material are spiral sleeves of thin layers separated by spiral sleeves of thin layers of the separator.

In some embodiments, the oxidizable material and the reducible material comprise planar layers separated by thin planar layers of the separator.

In some embodiments, the oxidizable material and reducible material are arranged in an interdigitated array.

In some embodiments, the oxidizable material and the reducible material comprise thin, flat layers.

In another embodiment, a method of using an electrochemical rocket motor is provided. The method includes orienting the electrochemical rocket motor. The electrochemical rocket motor comprises an oxidizable framework, a reducible framework, a non-electrically conductive separator, and a nozzle. The oxidizable framework comprises an oxidizable material. The oxidizable material being electrochemically convertible such that during electrical charging, at least a portion of the oxidizable material is converted into an active oxidizer. A first conductive framework is in electrical communication with the oxidizable material. The reducible framework comprises a reducible material, which, during charging, is at least partially reducible to a fuel. A second conductive framework is in electrical communication with the reducible material. The non-electrically conductive separator is positioned between and electrically separating the oxidizable material and a reducible material. The nozzle is connected to the end of a motor for channeling gas release. The method further includes electrochemically oxidizing the inert oxidizer, triggering the ignition of the oxidizer and the fuel to produce hot gasses and channeling the gasses through the nozzle to generate thrust.

In some embodiments, the triggering occurs via piercing the separator.

In some embodiments, the triggering occurs via electrically sparking a hole in the separator.

In some embodiments, the triggering occurs via thermally melting the separator.

In some embodiments, the amount of thrust generated is controlled.

BRIEF DESCRIPTION OF THE DRAWINGS

These and other features, aspects, and advantages of the present disclosure will now be described with reference to the drawings of embodiments, which embodiments are intended to illustrate and not to limit the disclosure. One of ordinary skill in the art would readily appreciate that the features depicted in the illustrative embodiments are capable of combination in manners that are not explicitly depicted but are both envisioned and disclosed herein.

FIGS. 7A and 7B are schematic diagrams of the operation of a spark gap trigger.

FIGS. 8A and 8B are schematic diagrams of the operation of a pressure trigger or a mechanical trigger.

FIGS. 9A and 9B are schematic diagrams of the operation of a thermal decomposition trigger.

DETAILED DESCRIPTION

This disclosure is directed to solid rocket motors that can be shipped and stored with an inert oxidizer and or/fuel and that can be activated after manufacture and prior to use, allowing for safe transport, storage, and handling. The motor consists of a housing containing fuel and an inert oxidizer, separated by an electrically non-conductive, but ion conducting interface. The housing has a nozzle at the end for gas release and channeling. Prior to use, the inert oxidizer is activated by electrochemically oxidizing it, generating an active oxidizer. Optionally, the same procedure can also drive a reduction process for generating additional fuel. Ignition can be triggered with various techniques, including but without limitation to thermally by melting a separator between the oxidizer and fuel, electrically by creating a spark to form a hole in the separator, mechanically by piercing the separator, electrically/thermally by inducing thermal breakdown of the oxidizer and/or fuel, or other techniques. The contact of the oxidizer and fuel may start a chain reaction whereby the contents of the housing ignite and combust, generating hot gasses to be funneled out through the nozzle to generate thrust. Other ignition techniques can also be used wherein triggering can be caused by high temperatures such as sparks, flames, or plasmas.

Solid Rocket Motor

Figure 1:
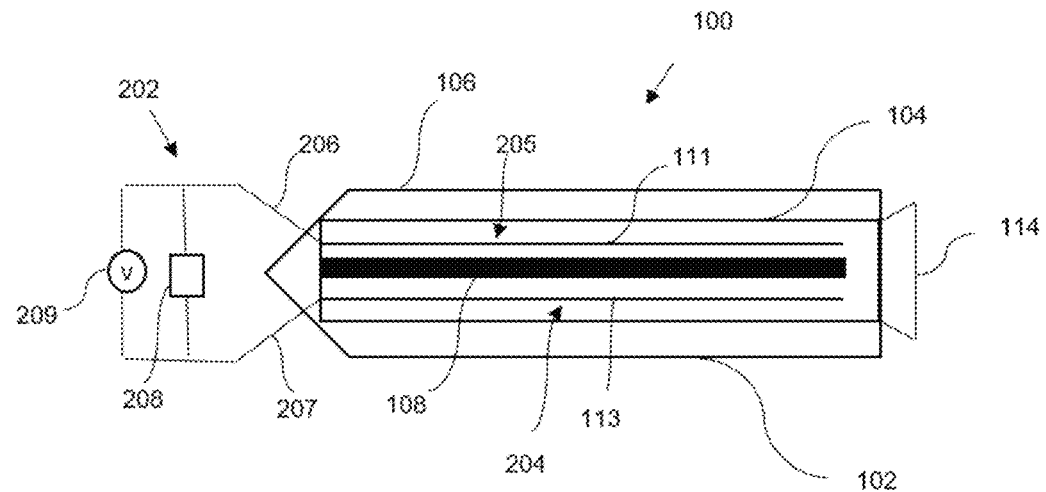
FIG. 1 is a schematic cross sectional diagram of an embodiment of a solid rocket motor.

FIG. 1 is a schematic diagram of an embodiment of a rocket 100. The rocket 100 can comprise a rocket body 102, a solid rocket motor 104, a housing 106 and a nozzle 114.

The motor 104 can comprise an oxidizer material 205 on a first conductive framework 111. The motor 104 can also comprise a fuel material 204 on a second conductive framework 113. The oxidizer 205 can be in an inert state, as can the fuel 204 on conductive framework 113. The conductive frameworks 111, 113 can also be the oxidizer 205 and fuel 204 themselves for cases where the oxidizer 205 and fuel 204 in their initial or manufactured states are electrically conductive. For example, in some embodiments, the oxidizer material 205 and the fuel material 204 can be used without conductive frameworks 111, 113. The oxidizer material 205 and the fuel material 204 can be sufficiently conductive that no additional conductive framework is needed. In other embodiments, the conductive frameworks 111, 113 can be composed of conductive materials such as metals, conductive carbons or polymers, or other electrically conductive materials.

In some embodiments, the oxidizer 205 includes an oxidizing or oxidizable material in a chemical state such that the oxidizer is not available for supporting oxidation (combustion) in the inactive state, but can be released by activation, for example, by applying an oxidizing electric current to the oxidizer 205.

The conductive frameworks 111, 113, can extend throughout the respective oxidizer and fuel materials 205, 204. The conductive material of the conductive frameworks 111, 113 can be, for example, aluminum or copper. The thickness of the conductive materials can be up to 10's of cm thick. However, other thicknesses can also be used. The ratio of conversion material (i.e., the oxidizer 205 or fuel 204) to conductive material can be from 1:10 10,000:1, however, other ratios can also be used. The ratio can be zero when the oxidizer 205 and the fuel 204 are used without conductive frameworks 111, 113 as described above, for example where the oxidizers and fuels are conductive.

The oxidizer 205 and the fuel 204 can be separated by a separator 108. The separator 108 can be a thin, electrically non-conductive, ionically conductive layer. In some embodiments, the separator 108 can comprise a porous polymer film or a ceramic material. The separator 108 can be ion transporting, and in some embodiments function as an electrolyte. In some embodiments, there can be liquid, solid, polymer, or gel electrolyte containing ions that bridges the oxidizer and fuel. In some embodiments, the separator 108 can include a liquid, gel, polymer, solid, or ceramic electrolyte, or other suitable material to bridge the oxidizer 205 and fuel 204.

By storing the oxidizer 205 in its inert state and maintaining a physical and/or electrical separation between the inert oxidizer 205 and fuel 204, the rocket 200 is in a benign state until the oxidizer 205 is activated, for example, by electrical charging or techniques for electrochemical or chemical oxidization. Therefore, the overall safety when storing, transporting, or handling the rocket 100 can be increased.

The inert oxidizer 205 and fuel 204 materials can be electrically and/or ionically conductive, or can include materials for conduction throughout, in layers, rods, grids, or other arrangements that allow for electrical and/or ionic current to flow into and out of the materials.

A positive lead 206 can be electrically connected to the oxidizer 205 and a negative lead 207 can be electrically connected to the fuel 204. In some embodiments, the negative lead 207 and the positive lead 206 can be mounted so as to be accessible on the exterior of the rocket 100, for example, to be connected to a power source 208, described below.

Optionally, the oxidizer 205 can be in the form of a lithium ion battery cathode material having alternating layers of metals and oxygen in its crystal structure. Fully discharged, this material (examples are lithium cobalt oxide, ($LiCoO_2$, LCO), lithium nickel cobalt aluminum oxide ($LiNi_{0.8}Co_{0.17}Al_{0.03}$, NCA), lithium nickel manganese cobalt oxide ($Li_mNi_xMn_yCo_zO_2$, NMC), lithium iron phosphate ($LiFePO_4$, LFP), lithium manganese oxides ($Li_2MnO_2$ of $Li_2Mn_2O_4$), LMO), and others) is very stable and are not oxidizing. During normal activation operations, the Li-ions are removed, creating oxidizing materials available for oxidizing the fuel with an electrochemical potential in excess of 4 V vs. $Li/Li^+$. The amount of Li that is extracted can be adjusted to create different amounts of oxidizer for the rocket. Equation 1 shows an example with LCO having half of its lithium removed from the crystal structure spontaneously decomposing to release heat ($\Delta$) and oxygen. This energy of decomposition heats up the gasses released and helps to generate thrust.

$$6Li_{0.5}CoO_2 \rightarrow 2Co_3O_4 + 2O_2 + 3Li + \Delta \qquad (1)$$

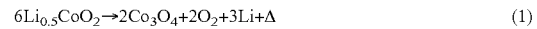

In some embodiments, the fuel can be a carbonaceous anode material, with the carbon in a layered structure similar to graphite, graphene, or other $sp^2$ carbons. The layered carbon can be electrochemically reduced in the presence lithium ions such that the lithium ions are incorporated into the carbon material structure between the carbon layers and the material accepts an electron from the electrical power supply. This reduced material is highly reducing, as low as 0.05 V vs. $Li/Li^+$. This material can react for example with oxygen (or similarly with other oxidizing materials) in a manner described in Equation 2:

$$4LiC_6 + 5OO_2 \rightarrow 2Li_2O + 24CO_2 + \Delta \qquad (2)$$

This reduced material is a more energy dense fuel than conventional carbon type fuels such as butyl rubbers, polymers, or alkanes/alkenes/alkynes. In some embodiments this charged carbon fuel can be supplemented or replaced through the formation of lithium (or other highly reactive metals such as sodium, magnesium, aluminum, or hydrogen)

to serve as a fuel. These metals are formed by the electrochemical reduction of the ions of these metals to form deposits of the solid metal (or bubbles of hydrogen) which can form on the surface of a conductive material such as carbon or another metal and serve as a fuel.

Equation 3 shows the combustion of lithium metal with oxygen:

$$4Li+O_2 \rightarrow 2Li_2O+\Delta \quad (3)$$

Additionally, the oxidizer 205 can include a first conductive framework 111, extending therethrough or otherwise in electrical contact with the material forming oxidizer 205. Similarly, the fuel 204 can include a second conductive framework 113, extending therethrough or otherwise in electrical contact with the material forming the fuel 204. The first and second conductive frameworks 111, 113 can be made from materials, including but without limitation, metals, typically copper, titanium, stainless steel, aluminum; conductive polymers, carbon materials, or other electrically conductive materials. Together, the oxidizer 205 and first conductive framework 111 can be considered as forming an oxidizer framework or an oxidizable framework 111. Similarly, fuel 204 and the second conductive framework 113 can be considered as forming a fuel framework or a reducible framework 113. In such embodiments, the negative lead 207 can be electrically connected to the first conductive framework 111 and the positive lead 206 can be electrically connected to the second conductive framework. Conductive frameworks such as the first and second conductive frameworks 111, 113, can be included in all of the embodiments of oxidizer frameworks and reducible frameworks disclosed below.

One technique for triggering ignition of the oxidizing agents and fuel, in some embodiments, is heating. Combustion can be initiated in a number of ways. In one mode, for example, when using certain polymer separators heated past ~140° C. internal temperature the polymer separator keeping the oxidizing cathode and the reducing anode (or fuel) melts. The two materials, cathode and anode, oxidizer and fuel, touch and release their stored energy, both the electrochemically stored energy as well as the chemical energy of combustion of the materials. This heats the adjacent activated oxidizing materials cathode, causing spontaneous decomposition forming oxygen and heat, which rapidly spreads the thermal runaway condition causing combustion which is discharged as an exhausting plume. Other oxidizers and reducers and triggering techniques can also be used in a similar manner.

FIG. 1 also depicts a charging and monitoring circuit 202. The charging and monitoring circuit 202 can be connected to the negative lead 207 and the positive lead 206 mounted so as to be accessible on the exterior of the motor 100. The charging and monitoring circuit 202 can include an activation device configured to activate the oxidizer 205 and/or the fuel 204, e.g., converting the oxidizer 205 from an inactive state to an active state, e.g., freeing oxidizing agents from inactive oxidizer 205. In some embodiments, the activation device can comprise a power source 208 configured to drive an electrochemical process that converts oxidizer 205 to its target activated (oxidizing) state. In some embodiments, switches (not shown) can be used to activate the conductive frameworks power source 208, but other activation devices are possible. The charging and monitoring circuit 202 can include a voltage sensor 209 for monitoring the state of charge of the motor. For example, the motor 200 can be charged to different degrees, further detailed below. In some embodiments, the power source 208 can also be used to activate the fuel 204.

The leads 206 and 207 can be made of any suitable material. Non-limiting examples of a suitable material include metals, conductive polymers, carbon materials, or other electrically conductive materials. In some embodiments, the conductive materials incorporated into any conductive framework, such as aluminum, polymers, and carbons can be converted into fuel, combusted in the motor 200.

Figure 2:
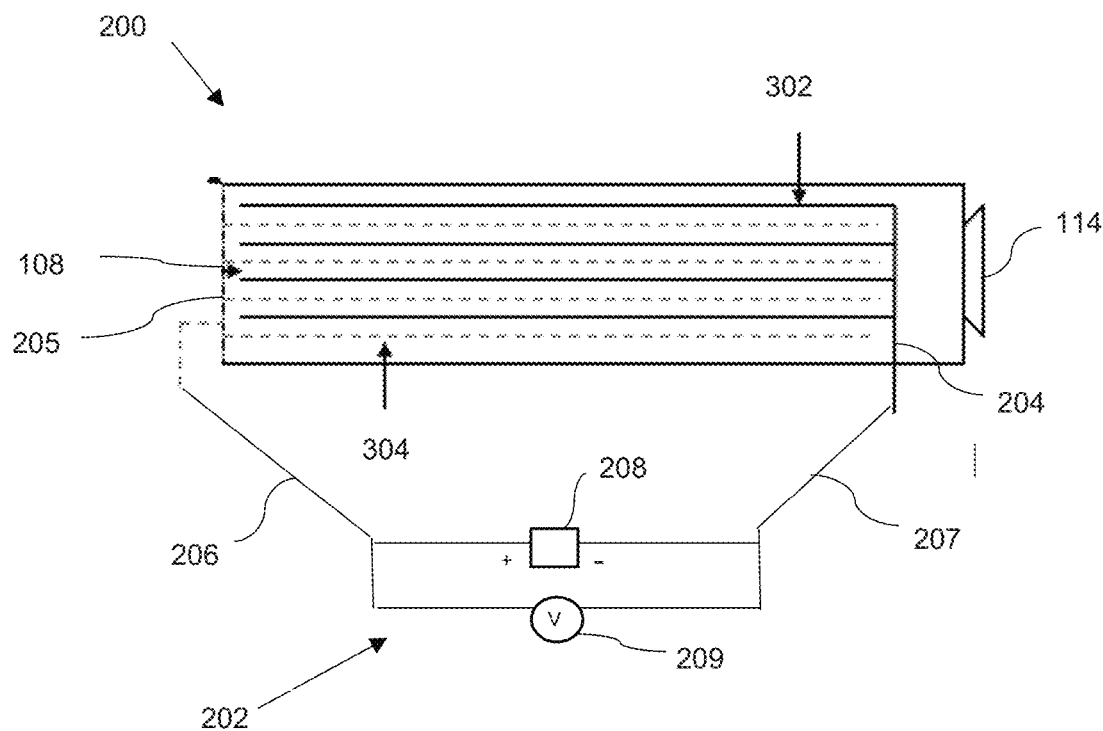
FIG. 2 is a schematic diagram of another embodiment of the solid rocket motor having an oxidizing framework and reducing framework within the motor.

FIG. 2 is a schematic representation of an optional internal structure of a motor 200 in which an oxidizable framework 302 serves as the oxidizer 205 and a reducible framework 304 serves as the fuel 204 of the embodiment of FIG. 1. As shown in FIG. 2, the oxidizing framework 302 and reducing framework 304 can be arranged in an alternating spacing and are electrically separated by an electrically nonconductive separator 108, for example a non-electrically conductive separator. The oxidizable framework 302 is connected to the negative lead 207. The reducible framework 304 is connected to the positive lead 206.

The negative and positive leads 207, 206 can be electrically isolated from each other. The leads 207, 206 can be connected to an activation device, such as the power source 208 of FIG. 1. As with the embodiment of FIG. 1, the oxidizable framework 302 can be configured to be charged or electrochemically oxidized so as to convert the inert oxidizer within the oxidizable framework 302 into an active state. The reducible framework 304 can also be configured to convert a reducible material into fuel.

As noted above, in some embodiments, the power source 208 can be used to fully or partially activate the motor 200, for example, by electrically "charging" the oxidizable framework 302 and reducible framework 304. In some embodiments, partial charging can occur, at any percentage, examples of which include 0%, 25%, 50%, 75%, and 100%, or any percentage therebetween. In some embodiments, due to the charging process, the partial charging of the motor will be uniform across the materials of the motor, for example, oxidizer and fuel will be generated uniformly or substantially uniformly through the oxidizable material and reducible material, respectively.

The voltage sensor 209 can be used to monitor the state of charge of the motor 200. The voltage sensor 209 can detect a voltage differential produced by additional electrons being provided to the oxidizable material within the oxidizable framework 302 during the charging process. The electrons removed from the oxidizable material can, in some embodiments, increase the electrochemical potential (increase oxidizing capability). The deficit of electrons in the oxidizable material in the oxidizer framework 302, can create a more positive electrochemical potential. The addition of electrons to the reducible material in the reducible framework 304 can lower the electrochemical potential (more energetic fuel). The changes in the electrochemical potential of the two frameworks 302, 304 can establish the measured voltage differential which can be detectable by the voltage sensor 209. The electrochemical potential difference can be proportional to the "charged" state of the motor, for example, the larger the voltage detected by the voltage sensor 209, the more oxidizing the cathode material is. Thus, voltages detected by the voltage sensor 209 can be correlated to a percentage activation of the motor, e.g., X volts corresponds to Y % activation.

Prior to charging, the motor 200 is in a benign state. The oxidizable material 205 of the oxidizable framework 302 can be in its inert state and not have been charged or electrochemically oxidized. The reducible material 204 of the reducible framework 304 can also be in an inert state and not yet been converted to more active fuel.

The motor 200 can be partially or fully charged by applying a sufficient voltage and current to the leads 206, 207. In some embodiments, the motor 200, and more specifically, the oxidizable framework 302 and the reducible framework 304 can be sized and arranged such that application of a current and voltage to the frameworks 302, 304 results in a predetermined amount of the available oxidizing agent in the oxidizable material 205 within the oxidizable framework 302 being released and a predetermined amount of the fuel material available in the reducible material in the reducible framework 304 being converted to fuel. Similarly, the motor 200 can be "charged" to any desired degree, e.g., 0%, 25%, 75%, 100%, or any amount therebetween or greater.

The thrust ultimately produced by the motor 200 can be controlled by the amount of oxidizer 205, fuel 204, or combination thereof activated by charging. The user can decide how much charge at the time of use. For example, the rocket motor can be partially charged to 0%, 25%, 50%, 75%, or any value up to or exceeding 100%. This can allow for more flexibility and adaptability of the rocket motor. The amount of charge can determine the total thrust output during the burn of the motor 200. The amount of charge can also determine how quickly or slowly the rocket motor ignites or the thrust profile (i.e., a long or short a burn). The capability of the motor to produce thrust is given by the ratio of oxidizer 205 to fuel 204 generated in the motor 200. In the uncharged state there can be no activated oxidizer 205, and a baseline amount of fuel 204. The charging of the motor with an electrical current to generate more oxidizer 205 and make the fuel 204 more energetic activates the motor 200. Due to the excess of fuel 204 in this system, the activated state of the battery is defined as the percent of total oxidizing capability that the motor 200 is at in any given charged state.

The oxidizable material 205 and reducible material 204 can be configured in a variety of designs within the housing of a motor (e.g., motor 200).

Figure 3:
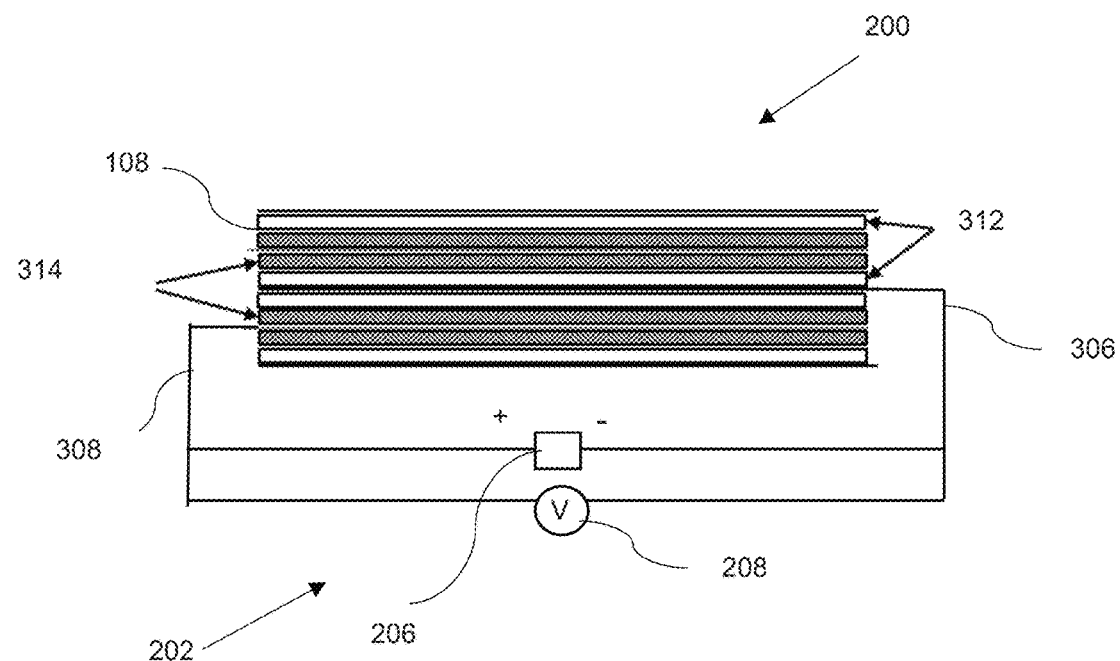
FIG. 3 is a schematic diagram of yet another embodiment of the solid rocket including paired layers of oxidizable material and paired layers of reducible material within a motor.

For example, FIG. 3 illustrates another optional internal structure of a motor 200 including an oxidizable framework 312 and a reducible framework 314. In this embodiment, layers of the oxidizable framework 312 are arranged in pairs of layers, with alternating pairs of layers of the reducible framework 314, and with single layers of oxidizable framework 312 as the outermost layers. The oxidizable framework 312 can be separated from the reducible framework 314 by a separator 108, as described above. The oxidizable framework 312 can be connected to the charging lead 306 to allow for conversion of the oxidizable framework 312 from an inert state to an active or charged state. The reducible framework 314 can be connected to the charging lead 308 to convert the reducible material to a fuel. The leads 306, 308 can be connected to a charging and monitoring circuit 202. The charging and monitoring circuit 202 can have a power source 208 and a voltage sensor 209.

Figure 4:
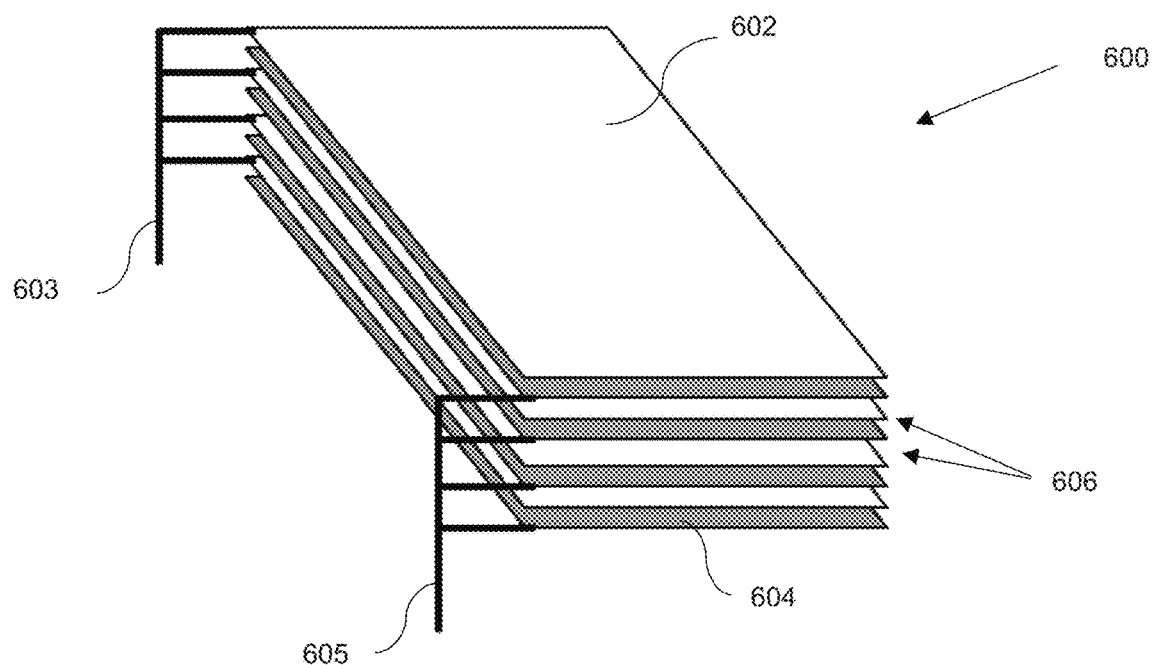
FIG. 4 is a diagram of a prismatic or stacked design of a solid rocket motor.

FIG. 4, illustrates an embodiment of a prismatic or stacked configuration 600. In this embodiment, thin layers of an oxidizable framework 602 can be alternatingly stacked with thin layers of a reducible framework 604. The thin layers 602 and 604 can be separated by thin layers of a separator (not shown) at positions 606. The layers of oxidizable framework 602 are connected to a first (negative) lead 603 and the layers of reducible framework 604 are connected to a second (positive) lead 605. The leads 603, 605 can be connected to a charging and monitoring circuit (not shown), such as the charging and monitoring circuit 202 shown in FIGS. 1, 2, and 3.

Figure 5:
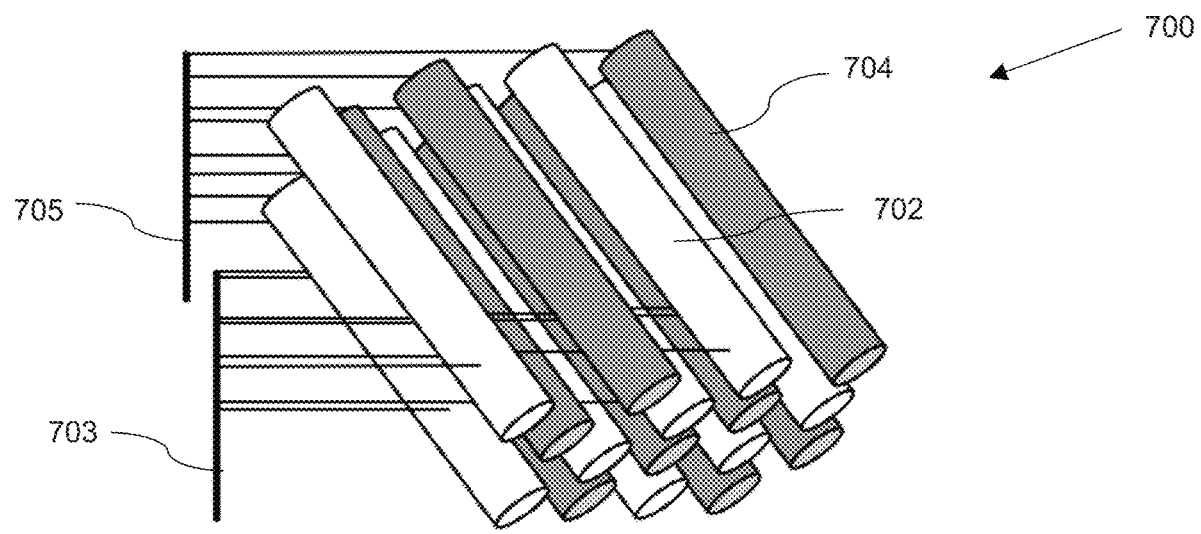
FIG. 5 illustrates an interdigitated design of a solid rocket motor.

FIG. 5 illustrates an interdigitated structure configuration 700 of an inert oxidizable framework 702 and a reducible framework 704. The oxidizable framework 702 and the reducible framework 704 are configured in rod-like shapes and placed alternatingly next to each other. Although not shown, a separating material (e.g., separator 108) can be included in this embodiment to separate the oxidizable framework 702 and the reducible framework 704. The oxidizable framework 702 is connected to a first (negative) lead 703 and the reducible framework 704 is connected to a second (positive) lead 705. The leads 703, 705 can be connected to a charging and monitoring circuit (not shown), such as the charging and monitoring circuit 202 shown in FIGS. 1, 2, and 3.

Figure 6:
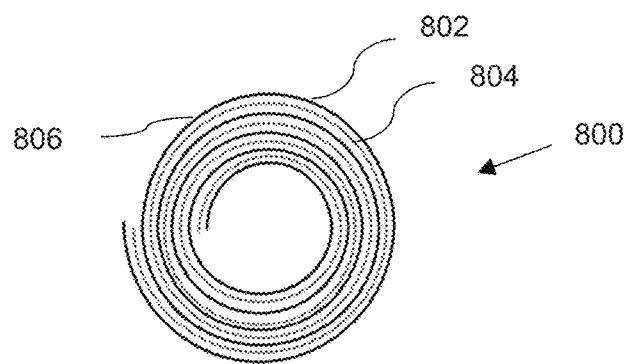
FIG. 6 is a diagram of a spiral design of a solid rocket motor.

FIG. 6 illustrates a spiral configuration 800 of an oxidizer framework 802, a reducible framework 804, and a separator 806. FIG. 8 is a top view of the spiral design 800. A thin layer of oxidizer framework 802, a thin layer of reducible framework 804 and thin layers of a separator 806 are stacked together and shaped to form a spiral type structure, as shown. The spiral configuration 800 can ease the manufacturing process because individual concentric sleeves are not needed. The thin layers 802, 804, and 806 can be stacked, then rolled to form a compact configuration that is more space efficient for the typical, cylindrical configuration of a rocket motor body.

Various different techniques can be used to ignite the oxidizer and fuel. FIGS. 7-9 depict three possible triggering processes. The triggering of the solid rocket motor is not limited to the three triggering processes depicted; other triggering processes can also be used. At the time of ignition, hot gasses will be produced.

FIGS. 7A and 7B depict a spark gap trigger. Pre-triggered state 900 illustrates a separator 108 and a trigger 902a in an inactive state (FIG. 7A). The spark gap trigger 902a can electrically spark 902b a hole in the separator 108 to trigger contact and ignition between an oxidizer and a fuel (FIG. 7B).

FIG. 8A depicts a pressure trigger comprising a first portion 904a and a second portion 904b in a pre-triggered state 903. In some embodiments, the first portion 904a can apply a force on a separator 108 moving the separator 108 towards the second portion 904b. The second portion 904b can puncture or pierce the separator 108 to trigger contact and ignition between the oxidizer and fuel as shown by the triggering process 905 (FIG. 8B).

FIGS. 9A and 9B depict a thermal decomposition triggering event. Pre-triggered state 907 shows a fully intact separator 108 with no thermal energy being applied (FIG. 9A). The triggering process 906 can produce thermal energy or heat 908 to thermally melt the separator 108. The thermal decomposition of the separator 108 can trigger contact and ignition of the fuel and oxidizer (FIG. 9B).

Figure 10:
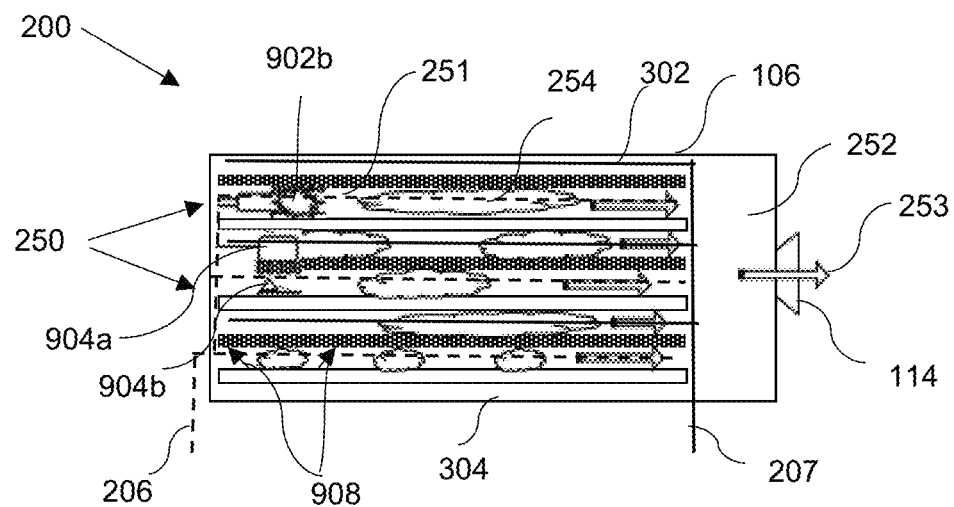
FIG. 10 depicts the channeling and ejecting of hot gasses out of the nozzle to generate thrust.

FIG. 10 is a schematic illustration of the motor 200, after charging and igniting, for example, with any of the above ignition devices. As described above, the motor 200 can include an oxidizable framework 302 and a reducible framework 304. The oxidizable framework 302 can be connected to a negative lead 207 and the reducible framework 304 can be connected to a positive lead 206. The leads 206, 207 can be connected to a charging and monitoring circuit 202 as shown, for example, in FIG. 2. As illustrated, the combustion results in the channeling and ejecting of hot gasses 254 out of the nozzle 114 to generate thrust. More specifically, after the ignition is triggered, the contact of the fuel 204 and oxidizer 205 starts a chain reaction.

Ignition can be triggered by any of the methods and devices described above, including an electrical spark 902b, a pressure trigger 904a, 904b, and thermal heat 908 as shown. The content of the housing 106 ignites and generates hot gasses 254. The hot gasses 254 can pass through gas flow channels 250 comprising compartments 251 to an expansion chamber 252 for gas expansion and be funneled out the nozzle 114 to generate a controlled thrust as shown by arrow 253. The amount of thrust 253 generated can be controlled by how much oxidizer 205 and fuel 204 is generated by the conductive frameworks as described throughout this application.

Figure 11:
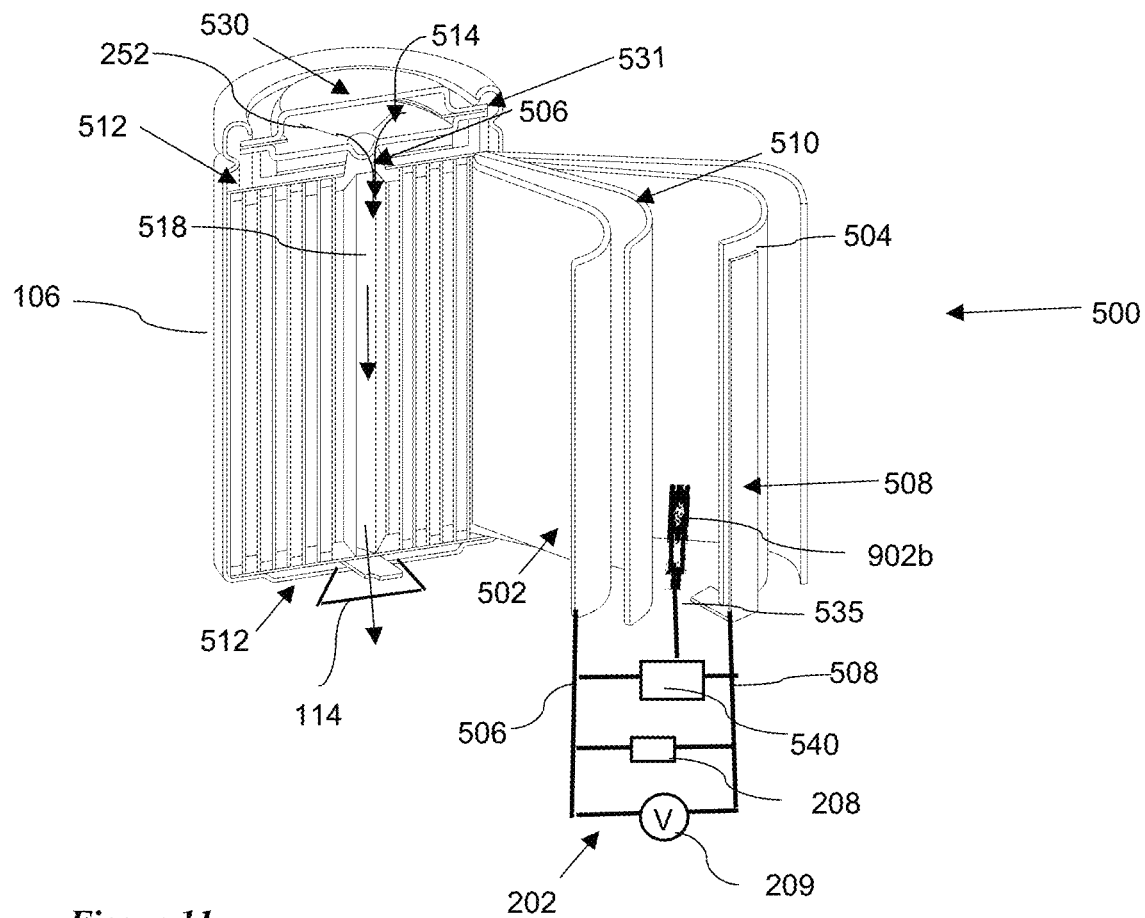
FIG. 11 is a diagram of a cylindrical design of a solid rocket motor.

FIG. 11 illustrates an embodiment of a cylindrical motor 500. The cylindrical motor 500 can include thin layers of an oxidizable framework 502 in its inert state and thin layers of a reducible framework 504 separated by thin layers of a separator 510. The thin layers of an oxidizable framework 502, a reducible framework 504, and a separator 510 are shaped as concentric sleeves or as spiral rolled sleeves. For example, a concentric sleeve of an oxidizable framework 502 can have a concentric sleeve of a separator 510 positioned inside it and the concentric sleeve of the separator 510 can have a concentric sleeve of a reducible framework 504 positioned inside it. Any number of layers of concentric sleeves may be used. Any of the above describe triggering devices and methods can be used with motor 500. For example, an electrical spark 902b can be used as shown. Any trigger described above can be used and connected to a trigger lead 535. The trigger lead 535 can be connected to a launch control box 540.

The oxidizable framework 502 can be connected to a first lead 506 and the reducible framework 504 can be connected to a second lead 508. The leads 506, 508 can be connected to a charging and monitoring circuit 202 which can have a power source 208 and voltage sensor 209. The leads 506, 508 can also be connected to the launch control box 540. The thin layers of concentric sleeves 502, 504, 510 are configured to form a cylindrical shape, as shown in FIG. 11. In some embodiments the concentric sleeves 502, 504, 510 can be formed as rings of material. The cylindrical motor 500 can include an insulator 512 positioned between the internal elements of the motor 500 and a motor housing 106. The insulator 512 can limit or reduce the amount of heat exposed to the housing 106 during ignition. The cylindrical motor 500 can include a passage 518 to a nozzle 114 for gas release after ignition of an activated oxidizer and fuel. The gas can move to expansion chamber 252 to smooth the flow of the gas and then the gas can move to and down passage 518 and then out the nozzle 114 as shown by the arrows. The motor 500 can also include a top cover 530 and a PTC 531.

Methods

Figure 12:
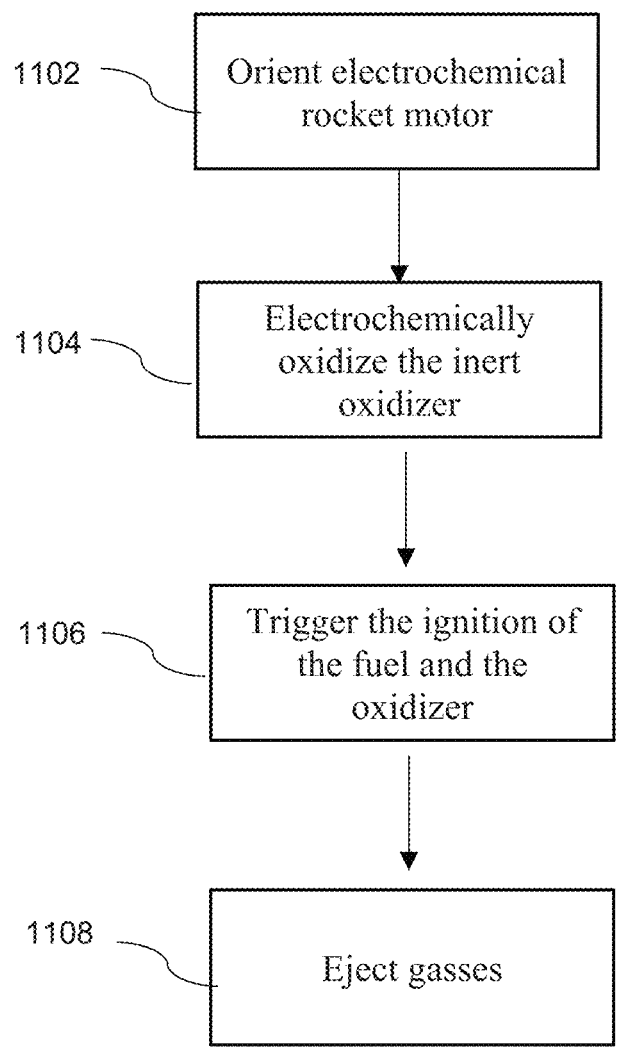
FIG. 12 is a flow chart of a method of using a solid rocket motor.

FIG. 12 depicts an exemplary method of using a solid rocket motor. Starting at block 1102 the electrochemical or solid rocket motor can be oriented for use. The rocket motor used can be any solid rocket motor including but not limited to any of the embodiments previously described.

Moving to block 1104 the inert oxidizer of the solid rocket motor can be electrochemically oxidized or charged. The motor can be charged to any value up to or exceeding 100% (fully charged). For example, the motor can be charged 25%, 50%, 75%, 100% or any other possible value. The amount of charge can determine how quickly the motor is ignited or determine the total thrust produced. The electrochemically oxidizing of the inert oxidizer generates an active oxidizer. In some embodiments the electrochemically oxidizing process can generate additional fuel.

Moving to block 1106 the fuel and the oxidizer can be combined to trigger ignition of the solid rocket motor. As discussed above, ignition of the oxidizer and fuel can be triggered in any suitable way, including but not limited to, thermally melting the separator, electrically sparking a hole in the separator, and mechanically piercing the separator. The contact of the oxidizer and the fuel can start a chain reaction whereby the contents of the housing ignite and generate hot gasses.

Moving to block 1108 the hot gases can expand in the compartments for expansion and can be directed through the gas flow channels. The gasses can be ejected out of the nozzle generating thrust. The amount of thrust generated can be controlled by the conductive frameworks or through other methods as described throughout this application. For example, the thrust output can be defined by the amount of oxidizer generated which can allow for a more controlled ignition. Additionally, the thrust does not need to be set from the time of design or manufacture of the motor.

Applications

The following description of possible applications of the inventions described herein are non-limiting examples. The inventions described herein can be applied to rocket motors that are expected to see dangerous handling or storage conditions, such as those on the battlefield. For example, a recoilless rifle, RPG round, or missile motor is in danger of activation prior to use. In addition, the simple and lightweight nature of the disclosure means it could be used for small sat maneuvering, as safe storage in rideshares requires no active stored energy. Other possible applications of the inventions include, but are not limited to, safe ammunition movement, launch assistance, launch vehicles, gas generators, any application of current state solid motors, short take off runways, and in connection with small satellites.

What is claimed is:
1. An electrochemical rocket, comprising:
a rocket body;
a motor disposed within the rocket body, the motor comprising:
an oxidizable framework comprising an oxidizable material, the oxidizable material being electrochemically convertible such that during electrical charging, at least a portion of the oxidizable material is converted into an active oxidizer, and a first conductive framework in electrical communication with the oxidizable material;
a reducible framework comprising a reducible material, which, during charging, is at least partially reducible to a fuel and a second conductive framework in electrical communication with the reducible material; and
a non-electrically conductive separator positioned between and electrically separating the oxidizable material and the reducible material; and
a nozzle fluidically connected to an end of the motor, wherein the nozzle is shaped to generate thrust by discharging combustion gases;
wherein, prior to charging, the oxidizable material and the reducible material are substantially inert and wherein after charging, in use, the active oxidizer and the fuel can be combined to combust, and thereby create the combustion gases discharged through the nozzle and generate a thrust.

2. The electrochemical rocket of claim 1, further comprising a mechanism for piercing the non-electrically conductive separator.

3. The electrochemical rocket of claim 1, wherein the thrust is controlled by partially charging the oxidizable material and the reducible material.

4. The electrochemical rocket of claim 1, wherein the oxidizable material and the reducible material are shaped as thin spiral sleeves separated by thin spiral sleeves of the non-electrically conductive separator.

5. The electrochemical rocket of claim 1, wherein the oxidizable material and the reducible material are configured in thin planar layers separated by thin planar layers of the non-electrically conductive separator.

6. The electrochemical rocket of claim 1, wherein the oxidizable material and the reducible material are arranged in an interdigitated array.

7. The electrochemical rocket of claim 1, wherein the oxidizable material and the reducible material comprise thin, flat layers.

8. The electrochemical rocket of claim 1, further comprising a thermal decomposition trigger configured to produce thermal energy or heat to melt the non-electrically conductive separator.

9. An electrochemical motor, comprising:
a housing enclosing an interior space, the interior space of the housing comprising:
an oxidizable framework comprising an oxidizable material, the oxidizable material being electrochemically convertible such that during electrical charging, at least a portion of the oxidizable material is converted into an active oxidizer;
a reducible framework comprising a reducible material, which, during charging, is at least partially reducible to a fuel; and
a non-electrically conductive separator positioned between the oxidizable material and the reducible material;
wherein, prior to charging, the oxidizable material and the reducible material are substantially inert and wherein after charging, in use, the active oxidizer and the fuel can be combined to combust, and thereby create combustion gases discharged through a nozzle and generate a thrust.

10. The electrochemical motor of claim 9, wherein the reducible framework is converted into the fuel.

11. The electrochemical motor of claim 9, wherein the thrust is controlled by partially charging the oxidizable material and partially charging the reducible material.

12. The electrochemical motor of claim 9, wherein the oxidizable material and the reducible material are spiral sleeves of thin layers separated by spiral sleeves of thin layers of the non-electrically conductive separator.

13. The electrochemical motor of claim 9, wherein the oxidizable material and the reducible material comprise planar layers separated by thin planar layers of the non-electrically conductive separator.

14. The electrochemical motor of claim 9, wherein the oxidizable material and the reducible material are arranged in an interdigitated array.

15. The electrochemical motor of claim 9, wherein the oxidizable material and the reducible material comprise thin, flat layers.

16. A method for using an electrochemical rocket motor comprising: orienting the electrochemical rocket motor, the electrochemical rocket motor comprising: a housing enclosing an interior space, the interior space of the housing comprising: an oxidizable framework comprising an oxidizable material, the oxidizable material being electrochemically convertible such that during electrical charging, at least a portion of the oxidizable material is converted into an active oxidizer, and a first conductive framework in electrical communication with the oxidizable material; a reducible framework comprising a reducible material, which, during charging, is at least partially reducible to a fuel and a second conductive framework in electrical communication with the reducible material, wherein prior to charging, the oxidizable material and the reducible material are substantially inert; a non-electrically conductive separator positioned between and electrically separating the oxidizable material and the reducible material; and a nozzle fluidically connected to an end of the electrochemical rocket motor for channeling gas release; charging the oxidizable material by electrochemically oxidizing the oxidizable material into the active oxidizer; triggering an ignition of the oxidizable material and the fuel to produce hot gases by combining the active oxidizer and the fuel to create combustion gases; and channeling the combustion gases through the nozzle to generate thrust.

17. The method of claim 16, wherein the triggering occurs via piercing the non-electrically conductive separator.

18. The method of claim 16, wherein the triggering occurs via electrically sparking a hole in the non-electrically conductive separator.

19. The method of claim 16, wherein the triggering occurs via thermally melting the non-electrically conductive separator.

20. The method of claim 16, wherein an amount of thrust generated is controlled.

\* \* \* \* \*